UNITED STATES PATENT OFFICE.

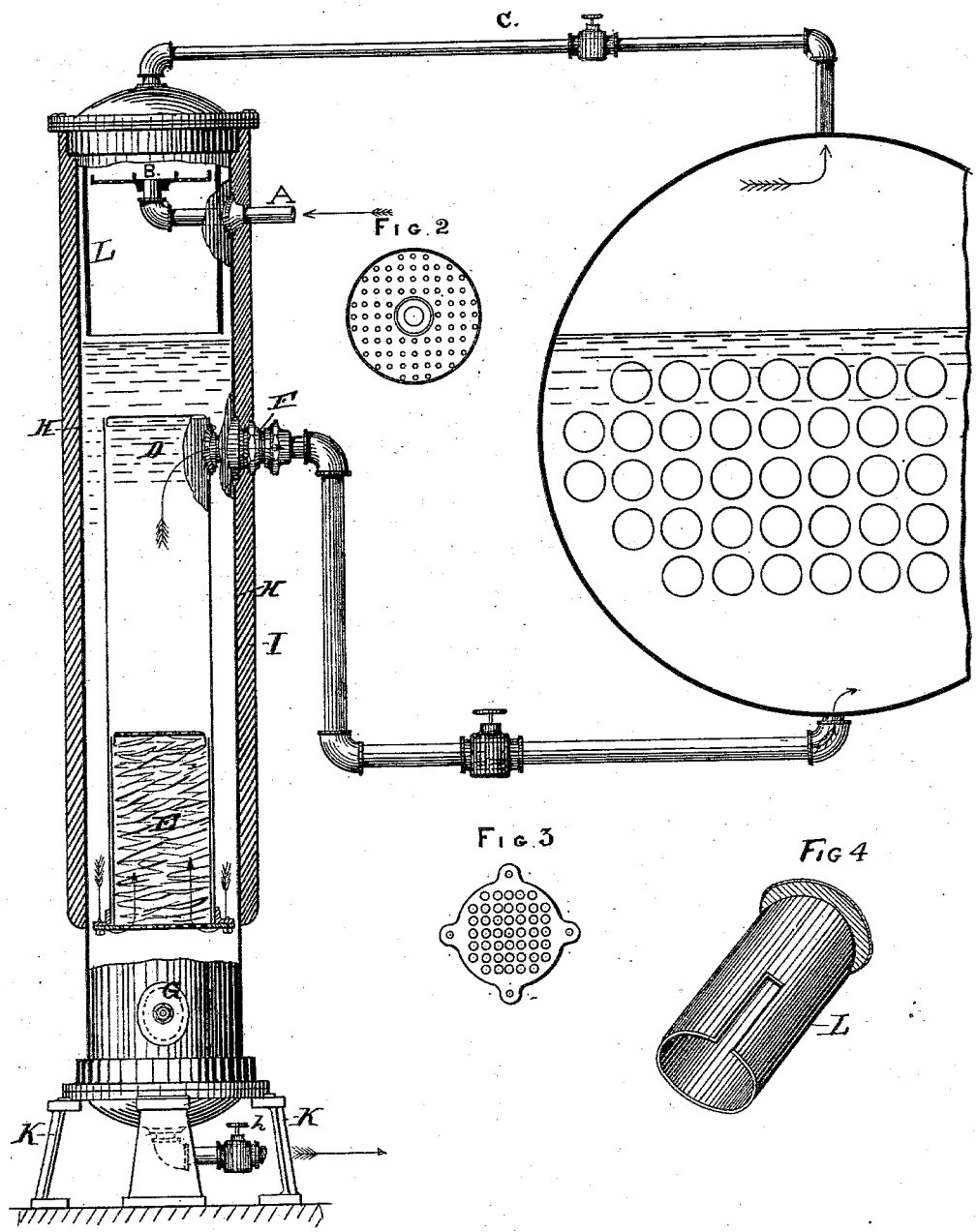

THOMAS REED BUTMAN, OF CLEVELAND, OHIO.

HEATER AND FILTER FOR STEAM-BOILERS.

SPECIFICATION forming part of Letters Patent No. 281,013, dated July 10, 1883.

Application filed March 1, 1883. (No model.)

*To all whom it may concern:*

Be it known that I, THOMAS R. BUTMAN, of Cleveland, in the county of Cuyahoga and State of Ohio, have invented certain new and useful Improvements in Heaters and Filters for Steam-Boilers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to that class of feed-water heaters in which steam is introduced to raise the temperature of the feed-water sufficient to precipitate the matter held in suspension and to filter the same before introducing it into the boiler.

It consists in an outer casing inclosing an inner casing having a filtering apparatus at its lower end, a scattering or diffusing pan in the upper end, and connections to the boiler, with other details of construction, as will be hereinafter more fully described, and pointed out in the claims.

It further consists in the combination of the outer cylinder or vessel having an upper and lower open end and adapted to be closed by detachable heads, and having a scattering or diffusing ring, as hereinafter described, and arranged with an inner cylinder suspended or otherwise secured within the outer cylinder in such manner as to be readily removed therefrom for cleaning.

In constructing the inner and upper cylinder, L, I prefer to turn a flange outwardly, so that it can be secured between the flanges of the outer cylinder and its head. This cylinder L is provided with a vertical slot in its side, which slips over the pipe A, so that when removed neither the joints of the pipe nor the diffusing-ring is disturbed. The object of cylinder L is to prevent the calcareous matter separated from the water by the heat from depositing itself upon the surface of the main cylinder. When feed-water that changes its condition by change of temperature is used, and the sediment held in suspension will readily separate by such change, the filter D may be dispensed with. It is a well-known fact that more or less impurities and extraneous matter are introduced into steam-boilers by the feed-water, and that many minerals held in solution therein will not precipitate unless brought to a temperature above that of the boiling-point, or ordinary exhaust-steam. My object is to precipitate these impalpable particles in the purifier.

The device is intended to act in conjunction with the ordinary feed-water heater, but may be operated entirely independent of the same, particularly where a condensing-engine is employed. In such case the water is taken direct from the hot-well and delivered to the purifier by either pump or injector. When the water coming in contact with the live steam of the boiler is brought to a high temperature, the greater part of the sediment is precipitated, and that which is still held in the water is prevented from entering the boiler by filtering.

In order that others skilled in the art may fully understand my invention, I will now proceed to describe the same, reference being had to the accompanying drawings, in which—

Figure 1 is a view of my device, partly in section. Fig. 2 is a plan view of the scattering or diffusing plate. Fig. 3 is a view of the bottom plate of the filter; and Fig. 4 is a detached view of the cylinder L, showing the elongated vertical slot.

H is the outer cylinder or casing, having a cover on its top, to which is attached the pipe C, leading to the steam-space in the boiler. Inside of the casing, and near the top, is an inner cylinder having a perforated scattering-pan, B, attached to the water-supply pipe A. The said pipe is connected with any well-known heater, or water is taken from the hot-well of a condenser, by means of a pump, into the cylinder H. The bottom of the cylinder is furnished with a hand-hole plate, G, and also a blow-off pipe and cock, *h*, for removing the sediment that collects in the bottom of the cylinder.

Within the cylinder or water-casing H is an inner cylinder somewhat shorter than the outer cylinder, and suspended thereto, about midway, by any well-known means. In the lower part of the inner cylinder is placed a filter, E. At the top of the cylinder D is the pipe F for connecting it with the water-space of the boiler. The apparatus is set on legs or supports K, in such a position that the level of the water of the boiler will be a little above the inner cylinder, D. The space above the water-line is filled with live steam at boiler-pressure through the pipe C.

The operation is as follows: The feed-water being forced through the pipe A into an inner cylinder and on the pan B, escapes through the perforations in said pan, and falls down in a shower through the live steam, which raises the water to a higher temperature. Thence it settles slowly down to the bottom of cylinder H. The water then passes up through the filter E to pipe F, thence passes to the boiler; but under some conditions the filter D may be dispensed with. The water passes from the purifier to the boiler by gravity, and, owing to the large area of the cylinder, the current of the water is slow, allowing the impurities to settle in the bottom of cylinder H, which are blown off periodically, or removed through the handhole covered by plate G. The filter may be made separate and slipped into the end of the cylinder D. To clean the filter the valve on the steam-pipe C is closed and the blow-off valve h is opened, the pressure of steam in the boiler causing the water to be forced therefrom through the filter in an opposite direction to that in which it was fed to the boiler, thereby removing, if not all, a greater part of the impurities held by the filtering material which need not be renewed so often.

The covering I is of any well-known material, and extends down only to the bottom of the inner cylinder. The rest of the outer cylinder is exposed to the atmosphere in order to slightly reduce the temperature of the water, which causes the impurities to precipitate, and therefore are blown off, as heretofore described.

While I have shown a particular form in the construction of my heater and purifier, I desire to say that I do not wish to be confined to the form shown, as they may be made with wide limits without departing from the spirit of my invention. Therefore

What I claim as new, and desire to secure by Letters Patent, is—

1. In a feed-water heater and purifier, the combination of an outer cylinder, a live-steam pipe leading to the top thereof, an inside cylinder suspended therein, having a filter at its lower end, and a water-pipe connecting the top of the inner cylinder with the bottom of the boiler, substantially as shown and described.

2. In a feed-water heater and purifier, the combination of an outer cylinder and its covering extending to the bottom of the inner cylinder, whereby the lower part of the water-cylinder is exposed to the atmosphere, by which the temperature of the water is reduced, substantially as described, and for the purpose specified.

3. In a feed-water heater and purifier, the combination of an inner cylinder having a filter in its lower end, and an outer cylinder having a covering extending to the bottom of the inner cylinder, the lower portion of said outer cylinder being exposed to the temperature of the atmosphere for cooling the water, substantially as shown, and for the purpose described.

4. In combination with the outer cylinder of a feed-water heater and purifier, an inner cylinder having a filter at its lower end and water-exit pipe at its upper end communicating with the boiler, the said outer cylinder also having at its upper portion a water-supply pipe and a steam-pipe, by which the steam and water are commingled before they reach the filter, for the purpose set forth.

5. In a feed-water heater and purifier, the combination, with the outer cylinder, of the water-supply pipe, the scattering-plate, the steam-pipe, the boiler supply-pipe, the inside cylinder at its upper end, the covering, and the blow-off pipe, substantially as shown and described.

In testimony that I claim the foregoing as my own I affix my signature in presence of two witnesses.

THOMAS REED BUTMAN.

Witnesses:
O. E. DUFFY,
B. F. MORSELL.